United States Patent Office 3,146,526
Patented Sept. 1, 1964

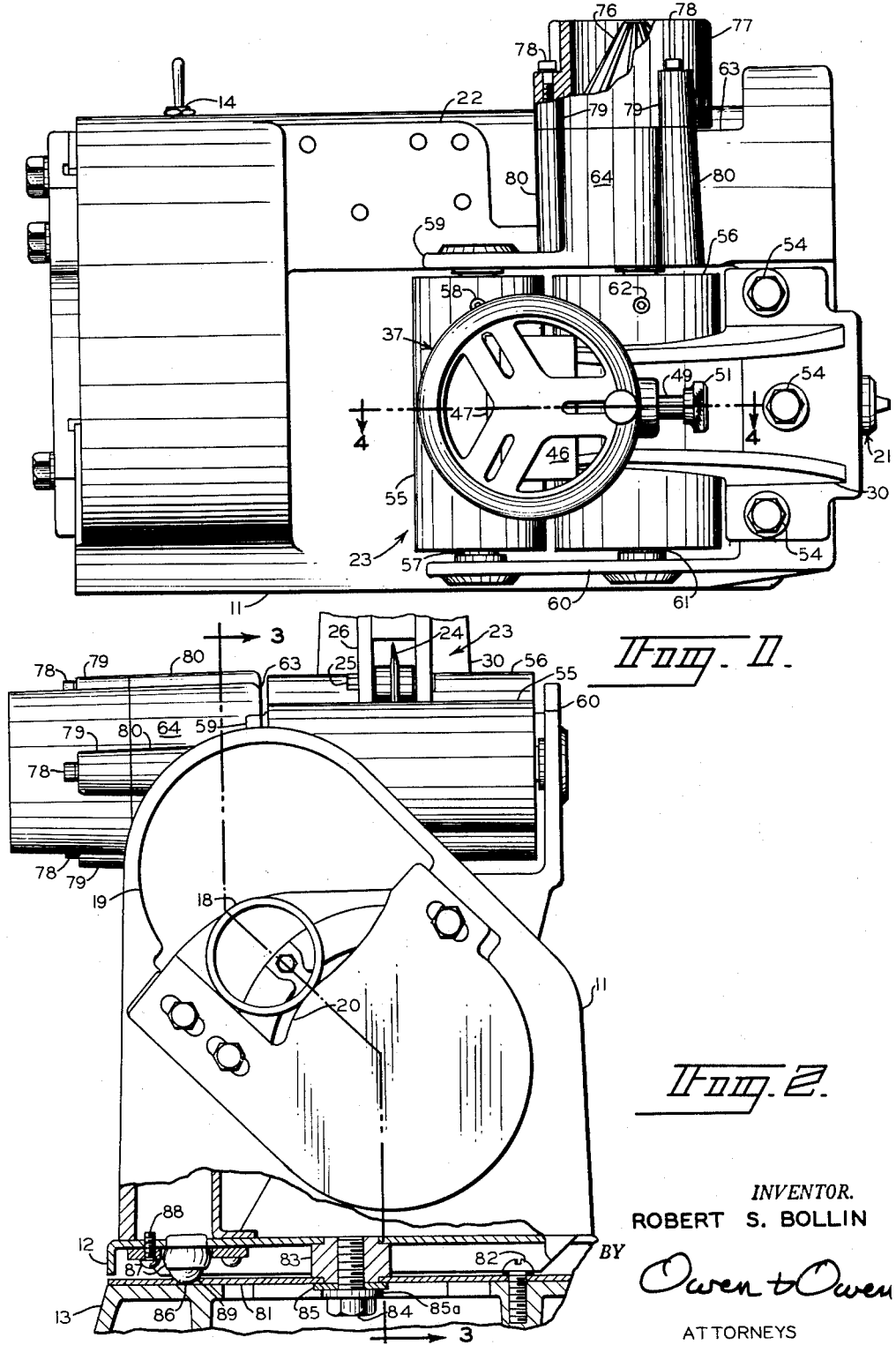

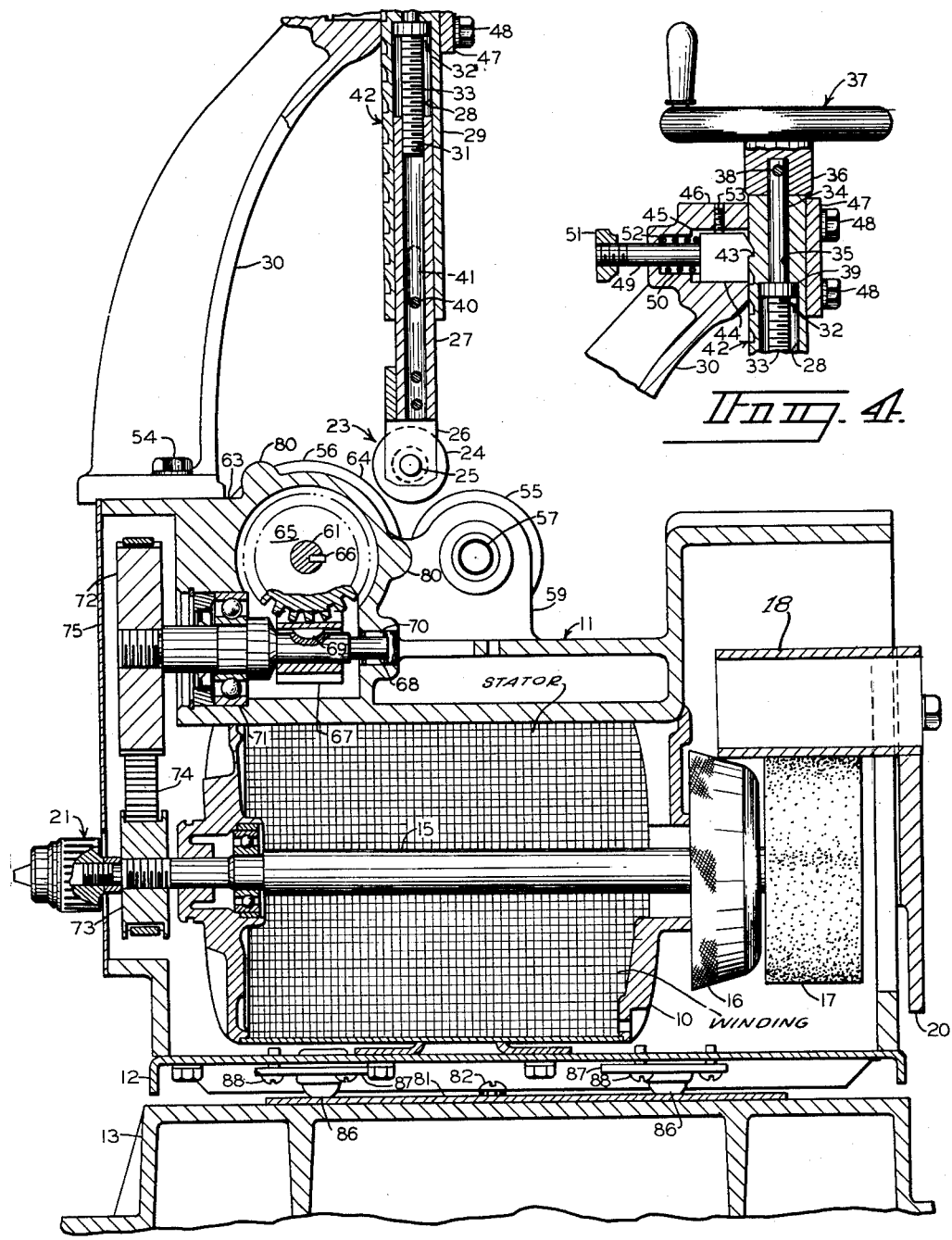

3,146,526
APPARATUS FOR PREPARING TUBING FOR
A SWEATED JOINT
Robert S. Bollin, Toledo, Ohio, assignor, by mesne assignments, to Toledo-Beaver Tools, Inc., a corporation of Ohio
Filed Nov. 17, 1960, Ser. No. 69,881
3 Claims. (Cl. 29—564)

This invention is concerned with apparatus for preparing a length of tubing or the like for a sweated joint and more particularly with apparatus for properly cutting and cleaning the end of the tubing.

A length of tubing is customarily prepared for a sweated joint by first cutting off the desired length of tubing with a hand device, such as a saw, which usually produces burrs on both the inner and outer peripheral edges at the end of the tubing. These burrs are then removed with a hand file, and the outside surface of the endmost portion of the tubing adjacent the outer peripheral edge is hand cleaned by rubbing it with emery paper or the like to remove all foreign material. Oftentimes the end of the tubing is not properly prepared and a poorly sweated joint results because either the end of the tubing is not thoroughly cleaned or the burr removal from the tubing is incomplete.

Various devices utilizing wire brushes for cleaning the exterior of the tubing and reamers for cleaning the interior of the tubing have been proposed. However, when devices of this type are used, the tubing must be cut substantially normal to its axis in order to obtain the greatest surface contact in the sweated joint as well as for the various cleaning tools to contact the required portion of the tubing.

In an attempt to solve this problem, various cut-off devices have been proposed which sever the tubing while located in a position remote from the cleaning tools. However, if the tubing which is to be cut and otherwise prepared is extremely long, it is difficult to cut the tubing in one position and move it to another position for cleaning. Also, the end of the tubing is susceptible to damage during movement from one location to another.

It is, therefore, the primary object of the invention to provide apparatus for preparing an endmost portion of a section of tubing for a sweated joint with a minimum of movement of the tubing.

A further object of the invention is to provide appartus which not only cuts the end of a section of tubing, but also deburrs and cleans the same end without excessive movement of the tubing.

These noted and more specific objects and advantages of the invention become apparent from the following detailed description and from the drawings wherein like numbers are used throughout to indicate like parts in which:

FIG. 1 is a plan view with parts broken away of apparatus for preparing tubing for a sweated joint and embodying the various features of the invention;

FIG. 2 is a view in elevation and with parts broken away taken from the left-hand side of FIG. 1;

FIG. 3 is a sectional view taken along the line 3—3 in FIG. 2; and

FIG. 4 is a sectional view taken along the line 4—4 in FIG. 1.

In order to achieve the objects of the invention apparatus for preparing an endmost portion of a section of tubing for a sweated joint is provided which utilizes a motor having various tube cleaning devices mounted on its drive shaft within a housing. The cut-off device which includes means driven by the motor for rotating the tubing during cutting is mounted at the top of the housing. Means are also provided on the bottom of the housing for rotating the entire unit to sequentially bring the cut-off device and the cleaning tools into engagement with the tubing with a minimum of movement of the tubing.

Referring now to the drawings, there is shown apparatus for preparing tubing for a sweated joint which includes an electric motor 10 mounted within a housing 11. A base 12 that is supported by a pedestal 13 carries the housing 11 and a switch 14 mounted on the side of the housing 11 is used to start and stop the motor 10. The motor 10 includes a shaft 15 which extends therethrough and protrudes outwardly therefrom at opposite ends.

A deburring drum or rotary file 16 is mounted on the drive shaft 14 adjacent the motor 10 as shown in FIG. 3, while a brush assembly 17 is likewise mounted for rotative movement on the shaft 15 adjacent the deburring drum 16 and outwardly therefrom. Both the drum 16 and the brush assembly 17 are covered by the housing 11, and the endmost portion of a section of tubing 18 which is to be cleaned is inserted into the housing 11 through a work receiving opening 19 provided in the end thereof as shown in FIG. 2.

The tubing 18 is moved into contact with both the drum 16 which removes burrs from the outer peripheral edge and the brush assembly 17 which simultaneously cleans a portion of the outside surface of the tubing 18 as it is rotated thereagainst by the operator. One part of the tubing 18 is maintained in the proper position relative to the deburring drum 16 and the brush assembly 17 by an adjustable guide 20 mounted on the end of the housing 11 adjacent the opening 19, while an outer portion of the tubing 18 is held by the operator.

A chuck 21 is mounted on the opposite end of the shaft 15 from the drum 16 and brush assembly 17 as shown in FIG. 3. A suitable reamer (not shown) may be inserted in the chuck 21 and the endmost portion of a length of tubing having an inside diameter less than approximately two inches is moved axially toward the chuck 21 until the reamer mounted thereon engages the inner peripheral edge of the tubing to remove burrs therefrom. With relatively large size tubing exceeding the diameter of the reamer, it does not simultaneously engage the entire inner peripheral edge of the tubing, and the operator moves the tubing around the reamer with a rotary motion to remove the burrs.

Extremely large size tubing having an outside diameter in excess of approximately four inches cannot enter the opening 19 because of size restrictions, and when such tubing is to be cleaned a suitable brush is inserted in the chuck 21. The outside surface of the tubing is cleaned by rotating the tubing against the brush. As shown in FIG. 1, an apertured holder 22 is provided on the upper surface of the housing 11 for receiving and storing the reamers and brushes when not in use.

According to the present invention, a cut-off device indicated at 23 is provided for cutting the end-most portion of a section of the tubing 18 at right angles to an axis which extends along the center of the tubing. As shown in FIGS. 2 and 3, the cut-off device 23 comprises a circular blade 24 having a sharpened peripheral edge for severing the tubing 18. The blade 24 is rotatably supported on a shaft 25 that is mounted in a yoke 26 which, in turn, is secured to the lower end of a vertically extending hollow support 27 by pins or other suitable attaching means. The support 27 is slidably mounted within a relatively large bore 28 in a sleeve 29 that is carried by a curve bracket 30 as shown in FIGS. 3 and 4.

The upper portion of the interior of the hollow support 27 is threaded at 31 to receive a shaft 32 that is threaded at 33. The shaft 32 has a cylindrical section 34 rotatably mounted within a smaller bore 35 in the sleeve 29 as shown in FIG. 4.

The upper end of the cylindrical section 34 is received within a centrally disposed hub 36 of a hand wheel 37 and is secured thereto by means of a pin 38 which passes through both the cylindrical section 34 and the hub 36. The bottom surface of the hub 36 engages the top surface of the sleeve 29 and prevents downward movement of the shaft 32. Upward movement of the shaft 32 is prevented by a shoulder 39 formed thereon which engages the interior of the sleeve 29 at the surface formed by the intersection of the large bore 28 with the small bore 35.

The outer surface of the support 27 is generally cylindrical and rotation of the suppor 27 within the large bore 28 is prevented by a pin 40 that is carried by the support 27 and is slidably received within a slot 41 formed in the sleeve 29. If desired the support 27 may be made with a substantially rectangular cross section, and the large bore 28 can likewise be made with a mating rectangular cross section thereby eliminating the pin 29 and the slot 40.

Inasmuch as the support 27 is restrained from rotation within the sleeve 29 and the shaft 32 is restrained from vertical movement by the hub 36 and the shoulder 39, rotation of the hand wheel 37 will cause a support 26 to slide within the sleeve 29. This, in turn, will cause reciprocal movement of the blade 24 along a path in a plane which is angularly disposed to the uppermost surface of the housing 11.

Movement of the support 27 is limited by the length of the slot 41, and to increase range of movement of the blade 24 provision is made to permit movement of the sleeve 29 relative to the bracket 30. As shown in FIG. 3, a rack 42 having a plurality of teeth is formed on the outer surface of the sleeve 29 which faces the bracket 30. Each of the teeth of the rack 42 is adapted to selectively mate with a single tooth 43 formed on a block 44 that is slidably received within a recess 45 in an enlarged portion 46 at the top of the bracket 30. The block 44 is slidable toward and away from the sleeve 29 along a path which is substantially normal to the path of movement of the blade 24, and the head 46 is provided with a yoke in which the sleeve 29 is slidably mounted. A cover plate 47 is secured to the head 46 on either side of the yoke by means of bolts 48.

A rod 49 extends outwardly from the block 44 away from the sleeve 29 through an extension 50 of the recess 45, and a knob 51 is secured to the end of the rod 49 to facilitate movement of the block 44 for selectively positioning the sleeve 29. The block 44 is urged toward the sleeve 29 by a suitable coil spring 52 which surrounds the rod 49 in the extension 50 to move the tooth 43 into mating agreement with the rack 42.

A setscrew 53 extends through the head 46 into the recess 45 for engaging the block 44, and when the setscrew 53 is tightened against the block 44 the tooth 43 is locked in engagement with the rack 42. Also the setscrew 53 may be used to hold the block 44 during assembly of the sleeve 29 in the head 46.

Bolts 54 secure the bracket 30 to the top of the housing 11 above the motor 10 towards the end thereof from which the shaft 15 protrudes as shown in FIGS. 1 and 3. The bracket 30 curves toward the opposite end of the housing 11 to position the blade 24 above the motor 10 substantially at the center thereof.

The cut-off device 23 also includes a pair of cylindrical support members in the form of an idler roller 55 and a drive roller 56 that are adapted to engage and support the endmost portion of the tubing 18 during cutting. The rollers 55 and 56 are mounted on the housing 11 between the support 27 and the motor 10 and extend in a direction normal to the path of the blade 24 to maintain the axis of the tubing 18 normal to the plane of movement of the blade 24.

An important feature of the cut-off device 23 is that the drive roller 56 has a diameter substantially larger than the diameter of the idler roller 55 in order to obtain adequate cutting action while preventing the tubing 18 from moving upward out of the valley formed between the rollers. The ratio of the roller diameters is preferably 1.44 to 1, for example, satisfactory cuts having been made with a cut-off device 23 which utilized a drive roller 56 having a diameter of 3.25 inches and an idler roller 55 having a diameter of 2.25 inches. The path of the cutter 24 also extends closer to the axis of the idler roller 55 than the axis of the drive roller 56 (see FIG. 3) so as to push the tube being cut toward the drive roller 56 and reduce slipping therebetween. This also tends to equalize the spacing between the periphery of the cutter 24 and the idler roller 55 and between the cutter 24 and the drive roller 56.

As shown in FIG. 1, the idler roller 55 is secured to a shaft 57 by a setscrew 58. The shaft 57 is mounted for rotation between a tab 59 adjacent the holder 22 and a protrusion 60 which extends upwardly from the top of the housing 11.

The drive roller 56 is likewise secured axially to a shaft 61 by a setscrew 62 and keys (not shown). One end of the shaft 61 is rotatably supported in the protrusion 60 while the other end extends through a gear box 63 formed on the top of the housing 11. The shafts 57 and 61 not only are parallel to each other but also are both parallel to the axis of the tubing 18 during cutting. A portion of the gear box 63 forms an extension of the drive roller 56 and is curved at 64 to form a segment of a cylindrical surface having a diameter slightly less than the diameter of the roller 56.

A worm gear 65 is secured to the shaft 61 within the gear box 63 by a key 66 and a mating worm 67 is secured to a shaft 68 by a key 69. The shaft 68 is both parallel to the shaft 15 and perpendicular to a vertical plane containing the axis of the shaft 61. The end of the shaft 68 towards the drum 16 is mounted for rotation within a needle bearing 70, and the center portion of the shaft 68 is likewise mounted for rotation in a ball bearing 71 mounted within the gear box 63.

A driven pulley 72 is mounted on the opposite end of the shaft 68 from the bearing 70 while a driving pulley 73 is mounted on the shaft 15 between the motor 10 and the chuck 21. A belt 74 connects the pulleys 72 and 73, and access to both the pulleys 72 and 73 as well as the belt 74 is provided by a removable cover plate 75 which is removably secured to the end of the housing 11 that is oppositely disposed from the opening 19.

It will be apparent that upon rotation of the shaft 15 the pulley 73 drives the belt 74 which, in turn, drives the pulley 72 to rotate the shaft 68. The worm 67 is rotated by the shaft 68 to drive the worm gear 65 which rotates the shaft 61 and the drive roller 56 thereby turning the tubing that is supported thereon. Inasmuch as the pulley 73 is substantially smaller than the pulley 72 and the pinion 66 has fewer teeth than the bevel gear 65, the shaft 61 is rotated at a much slower speed than the shaft 15. For example, satisfactory cuts have been made using a motor 10 having a rated speed of 3450 r.p.m. to drive the shaft 61 at a speed of 76.4 r.p.m. through a properly selected set of pulleys and gears.

A reamer 76 is mounted on the end of the shaft 61 that extends from the drive roller 56 through the gear box 63 in the direction of the tubing. A tubular cover 77 having an outside diameter equal to the diameter of the segment 64 of the gear box 63 encloses the reamer 76 to prevent accidental contact therewith by the operator and to form a continuation of the drive roller 56. The cover 77 is removably secured to the gear box 63 by bolts 78 which pass through ears 79 formed on the outer surface of the cover 77. Each bolt 78 is threadably received in a mating ear 80 formed on the surface of the gear box 63 on each side of the segment 64. Both the ears 79 and 80 serve to guide the tubing into contact with the drive roller 56.

A further important feature of the invention is the provision of means enabling the base 12 to be rotated about a vertical axis thereby moving the cut-off device 23 out of engagement with the tubing 18 and shifting with the chuck 21 or the drum 16 and brush assembly 17 to a working position adjacent the tubing 18.

Referring now to FIGS. 2 and 3, there is shown a plate 81 that is secured to the top of the pedestal 13 by screws 82. The plate 81 has an aperture located substantially at the center thereof, and a center post 83 having piloted portions at each end is mounted in this aperture by a bolt 84 that passes through a washer 85 and a spring washer 85a. The base 12 likewise has a suitable aperture located in its center which receives the top portion of the center post 83.

A plurality of balls 86 are rotatably mounted on the under surface of the base 12 by retainers 87 which are secured thereto by screws 88. The mounting plate has suitable detents 89 for positioning the base 12 at 90 degrees of rotation which is the angle between the axis of the tubing when positioned in the cut-off device 23 and when positioned in the work receiving opening 19.

In operation the switch 14 is moved to stop the motor 10 and the endmost portion of a section of tubing 18 which is to be prepared for a sweated joint is moved over the cover 77 and the segment 64 of the gear box 63 until it is engaged by the rollers 55 and 56. The hand wheel 37 on the cut-off device 23 is rotated in the proper direction to move the blade 24 away from the housing 11 until the pin 40 reaches the topmost position of movement in the slot 41. The operator then pulls the knob 51 to withdraw the tooth 43 out of engagement with the rack 42 and the sleeve 29 is shifted in the head 46 to move the blade 24 into engagement with the tubing 18.

The operator then starts the motor 10 with the switch 14 which causes the shaft 15 to rotate. Rotation of the shaft 15 causes the drive roller 56 to rotate in the manner previously described which, in turn, causes the tubing 18 to rotate. As the tubing 18 is rotated, the operator turns the handle 37 to move the blade 24 downwardly towards the housing 11 thereby severing the end of the tubing.

If the diameter of the tubing which has been cut off is relatively small, it is retracted along its axis a distance sufficient to enable it to clear the end of the cover 77 and be inserted therein into engagement with the reamer 76. However, as previously described, if the tubing is too large to fit within the cover 77 it can be cleaned by a reamer mounted in the chuck 21. This is accomplished by rotating the base 12 and housing 11 through an angle of 90 degrees about the center post 83 whereupon the chuck 21 is moved into a position adjacent the end of the tubing.

After the inner peripheral edge of the tubing has been cleaned by the reamer, it is withdrawn from the cover 77 and the base 12 is rotated to move the drum 16 and brush assembly 17 to a position adjacent the severed end of the tubing 18 whereupon the tubing is inserted in the opening 19 for cleaning the outside surface as well as deburring the outer peripheral edge. As previously described, if the diameter of the tubing is sufficiently large that it will not enter the opening 19, it can be cleaned by rotating the base 12 through 90 degrees after severing to bring the reamer which is carried by the chuck 21 into engagement with the cut-off end of the tubing 18. Also the outside surface of extremely large tubing may be cleaned by removing the reamer from the chuck 21 and inserting a suitable brush from the holder 22.

I claim:
1. In combination with apparatus for preparing an endmost portion of a section of tubing for a sweated joint, including a motor having a shaft extending therethrough, a housing for covering said motor, means mounted on the housing for cutting said endmost portion at right angles to a first axis extending along the center of the tubing, said means comprising a bracket secured to the housing above the motor, a support mounted on said bracket, means for moving said support in a lineal, reciprocating path toward and away from the housing, a circular cutting blade carried by said support for cutting the tubing, a pair of substantially cylindrical members mounted on the housing between said support and the motor to engage the endmost portion of the tubing and support the same during cutting, one of said cylindrical members being larger than the other, and means connecting the motor shaft to the larger one of said cylindrical members for rotating said one member about a second axis extending along the center thereof during cutting to rotate the tubing about said first axis.

2. In combination with apparatus for preparing an endmost portion of a section of tubing for a sweated joint, including a motor having a drive shaft extending therethrough, a housing for covering said motor, a bracket secured to the housing above the motor, a sleeve slidably mounted on said bracket for movement toward and away from the housing, rack means on said sleeve, a movable rack engaging element carried by said bracket for enabling said sleeve to be selectively positioned, a support slidably mounted in said sleeve and extending outwardly therefrom toward the housing, means for moving said support longitudinally with respect to said sleeve, a cutting member carried by said support for cutting the tubing, a pair of substantially cylindrical members mounted on the housing between said support and said motor to engage the endmost portion of the tubing and support the same during cutting, and means connecting the motor shaft to one of said cylindrical members for rotating said one member about a second axis extending along the center thereof during cutting to rotate the tubing about said first axis.

3. In combination with apparatus for preparing an endmost portion of a section of tubing for a sweated joint, including a motor having a drive shaft extending therethrough, a housing for covering said motor, a drive roller rotatably supported on said housing, means connecting said drive shaft and said drive roller for rotating said drive roller around a first axis, an idler roller, means for rotatably supporting said idler roller on said housing around a second axis in parallel, spaced relationship with respect to said first axes, said drive roller having a diameter larger than that of said idler roller, said drive roller and said idler roller cooperating to support a tubing section thereon with an axis of the tubing section being parallel to said first and second axes, a bracket secured to the housing above the motor, support means held by said bracket and slidably mounted with respect thereto, a cutting member carried by said support means for cutting the tubing section, means supported by said bracket for moving said support means in a lineal path, a plane through which is perpendicular to a plane through said first and second axis, with the line of the path being closer to said second axis than said first axis.

References Cited in the file of this patent
UNITED STATES PATENTS

| 871,828 | Sexton | Nov. 26, 1907 |
| 1,042,998 | Blackmore | Oct. 29, 1912 |
| 2,748,631 | Neale | June 5, 1956 |